Dec. 25, 1951   G. S. DAUPHINEE   2,579,477
AIR CONDITIONING APPARATUS AND THE LIKE
Filed May 28, 1949

INVENTOR.
GEORGE S. DAUPHINEE
BY
Eric J. Naundon
ATTORNEY.

Patented Dec. 25, 1951

2,579,477

UNITED STATES PATENT OFFICE 2,579,477

AIR-CONDITIONING APPARATUS AND THE LIKE

George S. Dauphinee, Brooklyn, N. Y., assignor to W. B. Connor Engineering Corp., New York, N. Y., a corporation of New York Application May 28, 1949, Serial No. 95,927

7 Claims. (Cl. 183—4.8)

This invention relates to improvements in air conditioning apparatus and the like and is concerned more especially with a device for estimating the useful life of granular adsorbents used in air purification. The device of the present invention is particularly adapted for use in conjunction with the air recovery apparatus disclosed in my co-pending application Serial No. 690,551, filed August 14, 1946, of which latter application the present application constitutes a continuation-in-part.

A primary object of the present invention is the provision of means for determining the useful life of an air purifying device in order to ascertain when it will become necessary to renew the adsorbent material retained therein, such as activated carbon or the like. The useful service life of activated carbon in air purification devices depends upon the amount of adsorbable gaseous impurities contained in the air to be treated and also upon the specific properties of the impurities. The continual variation in these factors results in variation in the useful life of the adsorbent in the air purification device.

It is conceivable that a gas detector means placed in the air stream leaving the purification unit would indicate the useful life of the adsorbent material or that the useful life of the adsorbent material might be predicted by an analysis of the air before passing through the unit. However, as a practical matter, it must be realized that gaseous impurities will produce a noticeably objectionable odor when present in the air even in extremely low concentrations and that these impurities comprise a variety of gases. Accordingly a practical procedure for predicting the useful life of an adsorbent such as activated carbon is to draw off a sample of the adsorbent after it has been in service for some time, for example, about one-half the contemplated useful life period. A laboratory test will then indicate the amount of the gaseous impurities retained by the carbon over this period by a simple weight determination.

Fabricators of air purifying devices have accumulated considerable data on the useful life period of activated carbon in air purifying service. This is expressed in terms of weight percentage of retained gaseous impurities. The average value is approximately 20% of the carbon weight and applies to ordinary service as, for example, in the purification of recirculated air for air conditioning with carbon bed thicknesses of ½ inch. If a sample of carbon is taken after having been in service for six months and shows 10% of gases retained, then the predicted total useful life of the carbon would be twelve months. It is assumed that, for any particular installation, the average concentration of the gaseous impurities will be approximately constant for each monthly period.

Accordingly it is an object of the invention to provide a sampling or test element which may be readily secured to and removed from an air purification device in order to indicate the degree of exhaustion of the adsorbent material and to predict the useful life period of the purification device.

Other objects and advantages of the invention will be readily apparent in the course of the following detailed description taken in connection with the accompanying drawing which illustrates a preferred embodiment of the invention and wherein.

Figure 1:
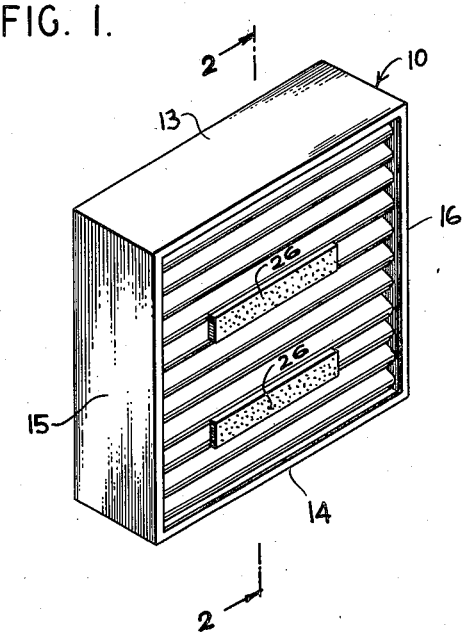
Fig. 1 is a perspective view of an air purifying device constructed substantially in accordance with application Serial No. 690,551 and having a pair of removable sampling or test elements in place.
Figure 2:
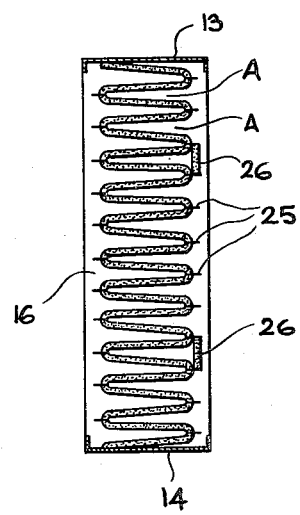
Fig. 2 is a sectional view taken on line 2—2 of Fig. 1.
Figure 3:
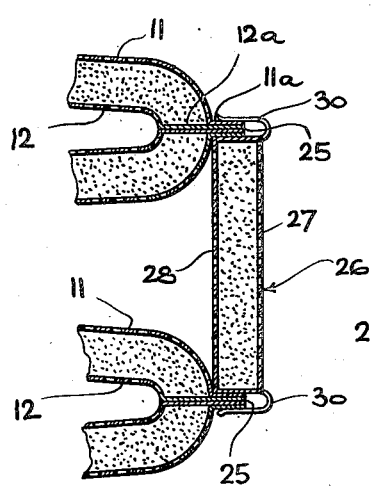
Fig. 3 is a fragmentary sectional detail illustrating the manner of removably associating the test elements with the air purification device.

Referring now to the drawings in greater detail, the air purification device comprises a cell generally designated by reference number 10. The capacity of the cell should be at least 250 cubic feet per minute of air per square foot face area and the resistance to this rate of flow should not be more than 0.2" water gauge. Cell 10 preferably consists of a pair of spaced substantially parallel perforated sheets of metal or other shape-sustaining material 11 and 12 which are bent in zig-zag or accordian pleated fashion to form a plurality of alternately reversed V-shaped elements which extend between the flanged top member 13 and the flanged bottom member 14 and the flanged side members 15 and 16.

Thus the cell 10 presents a large porous perforated area providing a plurality of pockets A. The entire volume of the recirculated air need not be passed through the porous invention, in accordance with the objects of the invention of my aforementioned co-pending application Serial No. 690,551 to which reference is made for full description of preferred details of construction with respect to the cell or air purification device proper. In my aforementioned application the V-shaped cells are formed with slots (not shown in the present drawings) extending substantially horizontally across the front face of the device. These slots are preferably located at the bent or bight of the V-cells and are formed by extensions 11a and 12a of the sheets 11 and 12 respectively. The extensions 11a and 12a define together with the sheets 11 and 12 transversely extending supports generally designated 25 which serve to retain the removable test elements 26 as will now be described.

Figure 4:
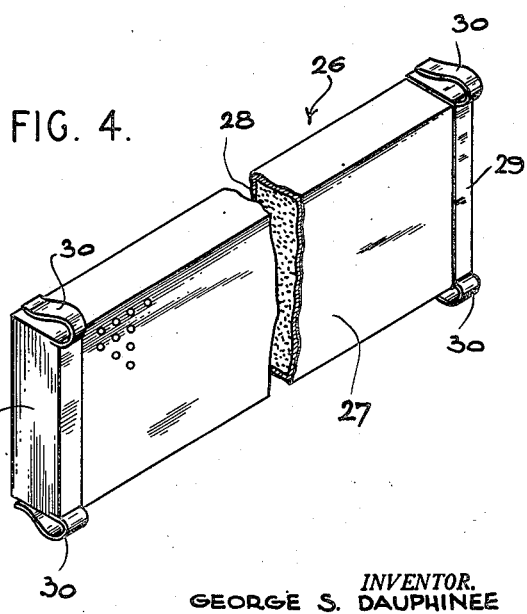
Fig. 4 is a perspective view of a removed test element having its perforated walls partly broken away to illustrate the adsorbent carbon filling therein and the clip members which serve to secure the test element to the air purification device.

As best shown in Fig. 4 test element 26 comprises a container having perforated front and rear walls 27 and 28 and being preferably, but not necessarily, of rectangular cross-section. Test element 26 is provided with end closure members 29 which may be secured in position in any desired manner. Means are provided on test element 26 for removably securing said element to the air purifying device 10 or any similar air purification unit. In the preferred embodiment of the invention this securing means takes the convenient form of upper and lower clip members 30 formed integrally with each closure member 29. By reason of the described arrangement the test elements 26 may be removably secured to the air recovery device 10 by engagement of the clip members 30 with the transversely extending supports 25 of an adjacent pair of V-cells. The sampling elements 26 are filled with the same adsorbent as the cell 10, such as activated carbon and the completely assembled unit provides an air permeable body.

It will be observed that the sampling elements 26 blocks the passage of air to a certain extent to that portion of the cell member directly behind it, thus establishing a differential air pressure across the sampling element sufficient to promote air flow therethrough. It will be further noted that air can flow around the ends of the sampling element 26 to reach the area of the cell member directly behind it.

The resistance of a cell 10 which is 24" x 24" x 7¾" at its normal capacity of 1000 cubic feet per minute is 0.105" W. G. and, after the addition of the two sampling elements 26, each of which is for example 12" x 2" x ⅜", is only 0.112" W. G. This slight increase in resistance may be ignored for all practical purposes. Moreover it is only rarely that an installation will consist of one cell only. When a multiplicity of cells is used, it is necessary to use a sampling element on one cell only. For example, when four cells are used, the increase in resistance would only be $$\frac{0.112'' - 0.105''}{4} = 0.00175'' \text{ W. G.}$$

The air velocity rate through the sampling element 26 may be about 50% of that through the cell 10. If the thickness of the carbon wall for the sampling element and for the cell members were the same, then the percentage of retained impurities in the case of the cell carbon would be twice as great as that in the case of the sampling element carbon and the ratio of 2 to 1 would remain constant throughout the service life. The combination of standard cell and standard sampling elements must be carefully tested to maintain this ratio.

The following example will illustrate the use of the sampling elements 26 for predicting the useful life period of air purification devices:

Assume retention limit ____ 20%
Assume ratio $\frac{\text{cell element}}{\text{sampling element}} = \frac{2}{1}$ or 2
Cell put in service _____ January 1, 1949
Sample removed for text ____ June 30, 1949
Duration _____ 6 months
Sample test shows _____ 5% retention
Cell retention _____ 5×ratio or 5×2 or 10
Predicted life $\frac{6 \times \text{retention limit}}{10}$ or 12 months It will be understood that this disclosure is given by way of example and not by way of limitation. On the other hand, the invention lends itself to a variety of expressions within the scope of the appended claims.

What is claimed is:

1. In combination with a device for adsorbing adulterants having a plurality of connected air-permeable units containing adsorbing material, a removable sampling element containing adsorbing material and having apertures permitting access of air to said material and means for removably associating said sampling element with said units, whereby to allow removal and testing of said element for predicting the useful life of the adsorbing material in said units.

2. In combination with a device for adsorbing adulterants a removable sampling element therefor, said device comprising a casing having an intake side and an outlet side, a plurality of air permeable units containing adsorbing material extending between the inlet side and the outlet side of said casing, said units having adsorbent wall members converging toward the intake side of said casing, said units having spaced supporting members disposed thereon, said sampling element being self-contained and adapted to retain adsorbing material therein, means permitting access of air to the adsorbing material in the sampling element and means secured to said sampling element and cooperating with said supporting members for removably associating said sampling element with the device, thereby to allow removal and testing of said element for predicting the useful life of the adsorbing material in said units.

3. In combination with a device for adsorbing adulterants having a plurality of air-permeable units containing adsorbing material, a removable sampling element constaining adsorbing material accessible to air, a plurality of said units having projecting portions extending outwardly therefrom, and securing means carried by said sampling element for removable association with said projecting portions of at least two units, whereby to allow removal and testing of said element for predicting the useful life of the adsorbing material in said units.

4. In combination with a device for adsorbing adulterants, a removable sampling element therefor, said device comprising a casing having an intake side and an outlet side, a plurality of air-permeable units containing adsorbing material extending between the inlet side and the outlet side of said casing, said units having adsorbent wall members converging toward the intake side of said casing, said units having spaced supporting members disposed therein, said sampling element being self-contained and adapted to retain adsorbing material therein and accessible to air and clip members carried by said sampling element and cooperating with said supporting members for removably associating said sampling element with the device, whereby to allow removal and testing of said element for predicting the useful life of the adsorbing material in said units.

5. A device of the character described comprising a casing open at two sides, an air-permeable unit containing adsorbing material in said casing and exposed through the open sides of the same, said unit being of undulated form, a removable sampling device in the form of an apertured container holding adsorbent material, said container being located between a plurality of the undulations in the unit and means for detachably securing said container at the apices of said undulations.

6. A device of the character described in claim 5, wherein the apex of each undulation in the unit is provided with a projecting strip, and the means for detachably securing the container consists in clips removably fitting over at least two of said strips.

7. A device of the character described comprising a support for a relatively large air-permeable unit containing adsorbing material for disposition in the path of an air stream, a device for determining the useful life expectancy of the adsorbing material contained in said unit, said device consisting of an apertured container holding adsorbent material substantially similar to that contained in the unit, and being much smaller in size than the unit, and means for attaching the filled container at a point on the unit where a true sample of the air stream passing through the unit will also reach the adsorbent contents of the container.

GEORGE S. DAUPHINEE.

REFERENCES CITED

The following references are of record in the file of this patent:

UNITED STATES PATENTS

| Number | Name | Date |
|---|---|---|
| 1,425,790 | Moyer | Aug. 15, 1922 |
| 1,655,248 | Sharp | Jan. 3, 1928 |
| 2,388,134 | Flosdorf et al. | Oct. 30, 1945 |

FOREIGN PATENTS

| Number | Country | Date |
|---|---|---|
| 257,879 | Great Britain | Jan. 24, 1927 |